United States Patent [19]

Moore

[11] Patent Number: 5,398,566
[45] Date of Patent: Mar. 21, 1995

[54] MANUAL ADJUST HAVING OPPOSITELY TOOTHED FITTING

[75] Inventor: Bruce H. Moore, Kent, Ohio

[73] Assignee: Teleflex Incorporated, Limerick, Pa.

[21] Appl. No.: 619,001

[22] Filed: Nov. 28, 1990

Related U.S. Application Data

[63] Continuation-in-part of Ser. No. 514,923, Apr. 26, 1990, abandoned.

[51] Int. Cl.$^6$ ............................................. F16C 1/22
[52] U.S. Cl. ............................ 74/502.4; 74/501.5 R; 74/502.6
[58] Field of Search ............... 74/500.5, 501.5 R, 502, 74/504.4, 502.6, 503

[56] References Cited

U.S. PATENT DOCUMENTS

| | | | |
|---|---|---|---|
| 3,675,898 | 7/1972 | Fattor et al. | 74/502.4 |
| 3,710,645 | 1/1973 | Bennett | 74/502.4 |
| 3,952,377 | 4/1976 | Morell | 74/502.4 |
| 4,321,840 | 3/1982 | Kalamon | 74/502.4 |
| 4,596,486 | 6/1986 | Niederer | 74/502.4 |
| 4,841,806 | 6/1989 | Spease | 74/502.6 |
| 5,188,115 | 2/1993 | Otani | 74/501.5 R |
| 5,220,832 | 6/1993 | Petruccello | 74/501.5 R |
| 5,295,408 | 3/1994 | Nagle et al. | 74/501.5 R |

FOREIGN PATENT DOCUMENTS

| | | | |
|---|---|---|---|
| 0244067 | 6/1990 | European Pat. Off. | 74/502.6 |
| 0508625 | 10/1992 | European Pat. Off. | 74/502.6 |
| 2-62415 | 3/1990 | Japan | 74/502.4 |

Primary Examiner—Vinh T. Luong
Attorney, Agent, or Firm—Reising, Ethington, Barnard, Perry & Milton

[57] ABSTRACT

A motion transmitting remote control assembly (10) including a conduit (12), and a motion transmitting core element (14) moveably supported by the conduit (12). A terminal (22) is attached to one end of the core element (14) for attachment to a member to be controlled. The terminal (22) adjusts the effective length of the core element (14) by manually locking the terminal (22) into any one of various locking positions and includes three members. The first member (24) includes a first (46) and second (48) plurality of teeth (50) inclined away from one another and is attached to the core element (14). The second member (26) is attached to the control member. The third member (28) includes a first (46') and a second (48') plurality of teeth (50') adapted for matingly interconnecting the first and second members (24, 26) and is moveable between an unlocked position, allowing relative movement between the first and second members (24, 26) and a locked position for preventing such relative movement. An alternative assembly includes a mid-conduit adjustment device having a first member and third member. Two rows of oppositely inclined teeth on the third member are moveable into locking engagement with two rows of oppositely inclined teeth on the first member.

18 Claims, 2 Drawing Sheets

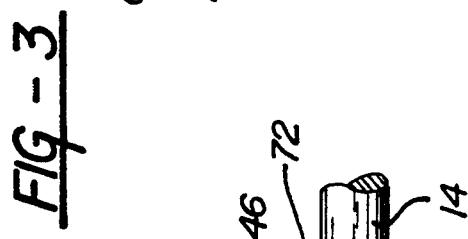
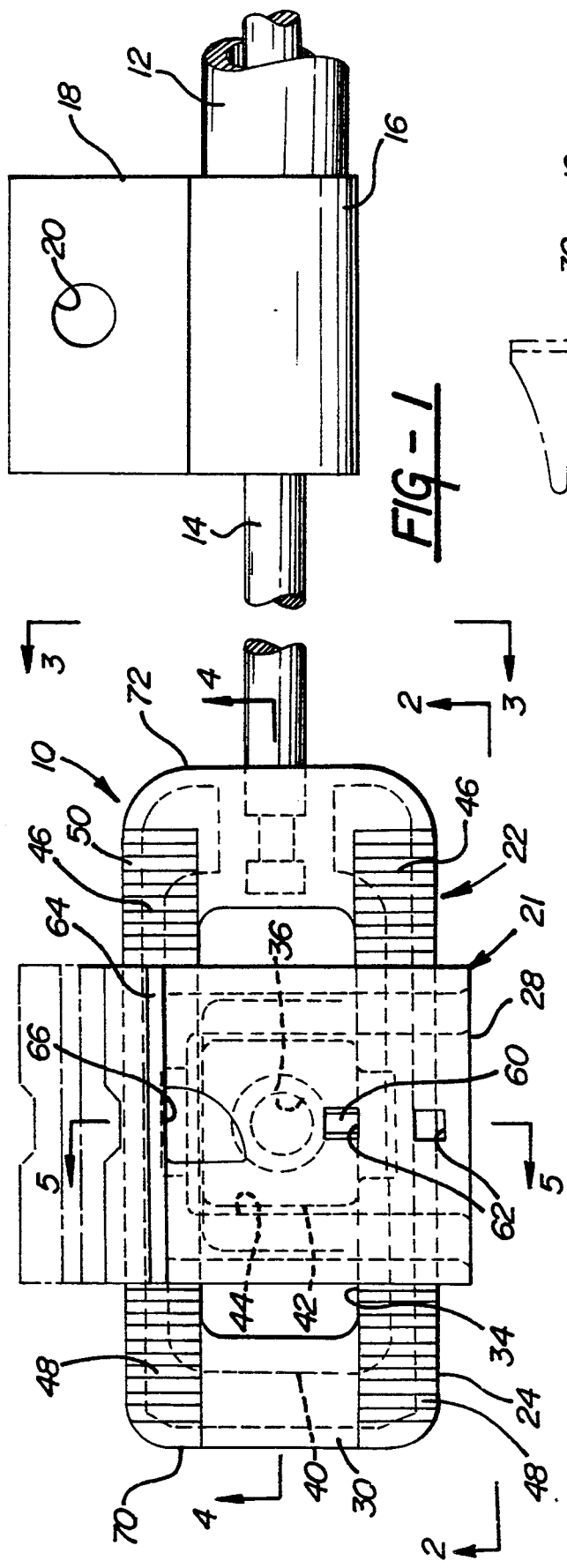
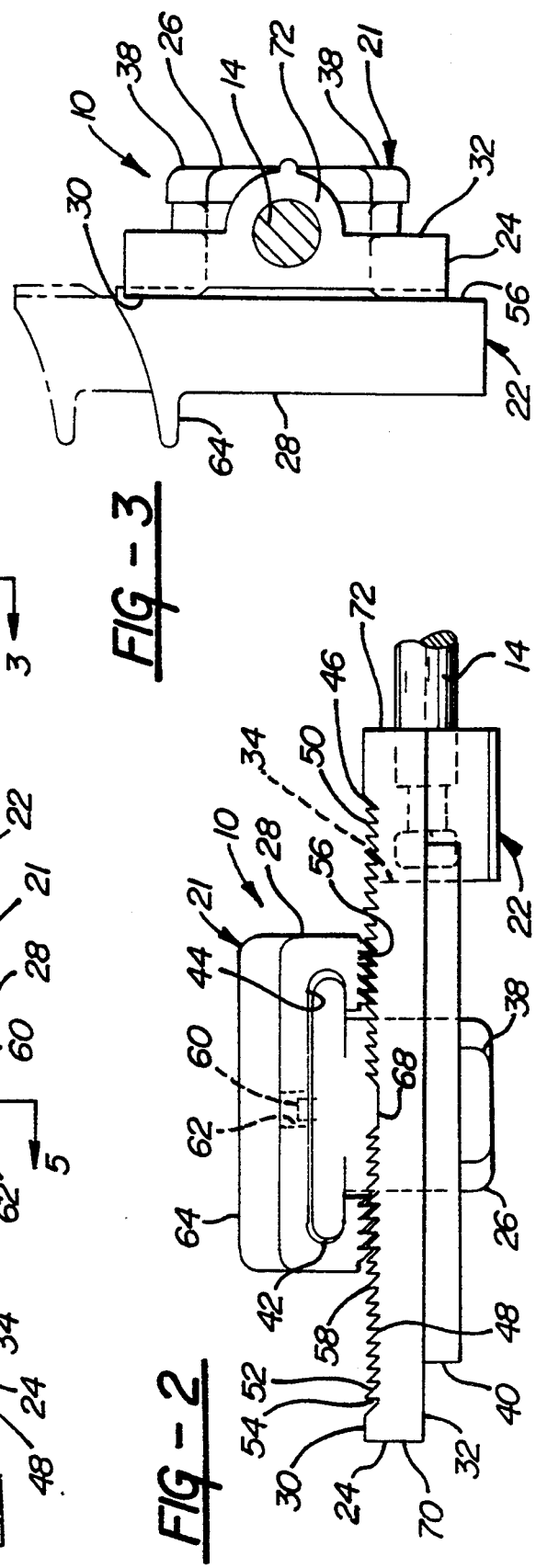

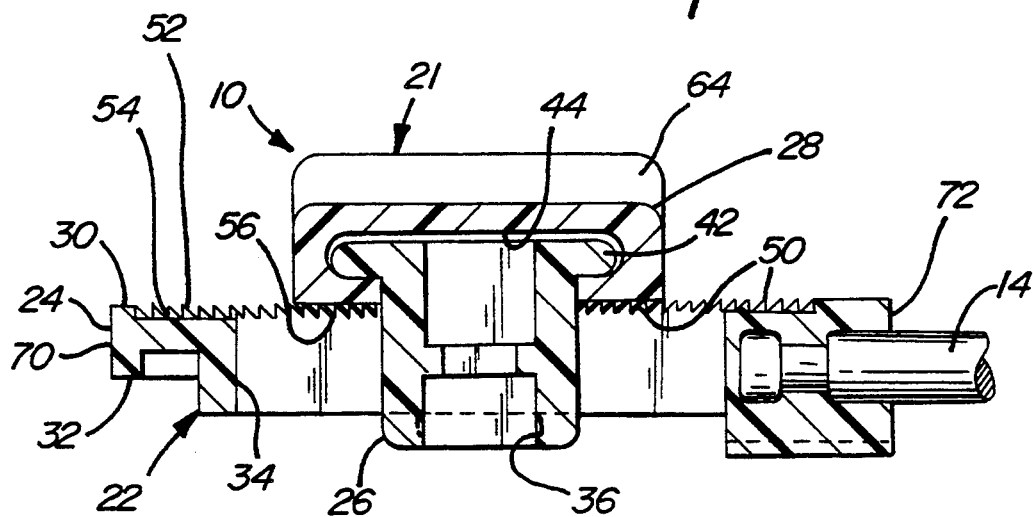
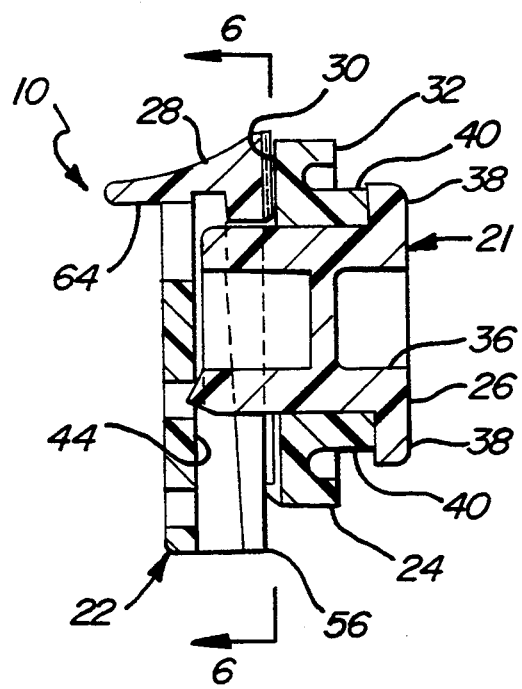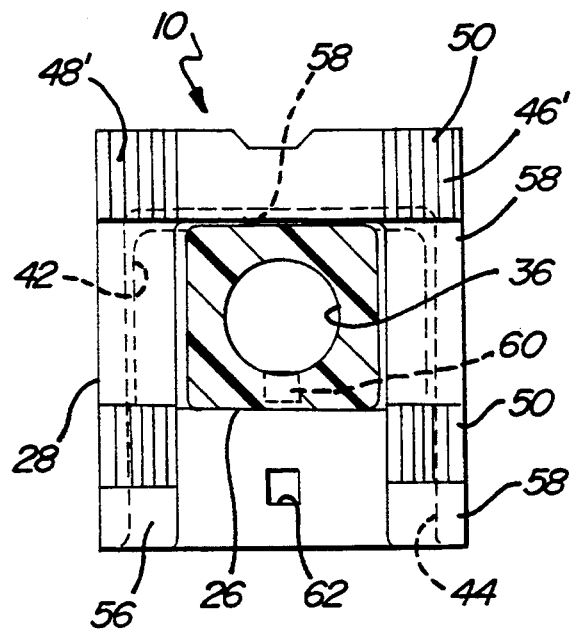
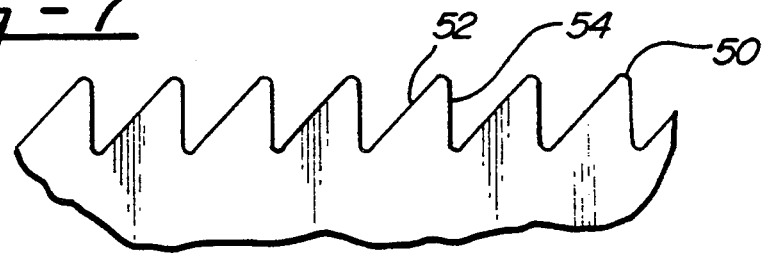

MANUAL ADJUST HAVING OPPOSITELY TOOTHED FITTING

This application is continuation-in-part of Ser. No. 514,923, filed Apr. 26,1990, now abandoned.

TECHNICAL FIELD

This invention relates to a flexible motion transmitting remote control assembly of the type for transmitting motion in a curved path by a flexible motion transmitting core element moveably supported by a flexible conduit.

BACKGROUND OF THE INVENTION

Remote control assemblies of the instant invention are used in aircraft, automotive, and marine environments. Typical of the use of such remote control assemblies is the positioning of heater and vent control members in automobiles.

In such applications it is frequently necessary to adjust the length or position of the end of the core element once the assembly has been installed. Such assemblies normally include one or more fittings secured to the conduit for attaching the conduit to the support structure of the automobile. The core element is attached to one end of the terminal member and is adapted to be attached to a member to be controlled whereas the other end has a matingly graspable knob secured thereto for longitudinally moving the core element. Frequently, after the assembly has been installed, it is necessary to adjust the overall effective length of the core element at the terminal end attached to the member to be controlled to a particular position. Adjustment of the overall effective length of the core element can be accomplished in either of two ways. Either the core element itself can be adjusted, or the conduit length can be adjusted. Also, this length adjustment can either be manually or automatically accomplished.

DESCRIPTION OF THE PRIOR ART

A prior art assembly directed to a solution of this problem is shown in U.S. Pat. No. 3,665,784 to Bennett, issued May 30, 1972 and assigned to the assignee of the subject invention. This patent discloses an adjustable terminal member wherein the effective length of the core element is adjusted at the terminal means in response to a predetermined force applied to the knob end of the core element. This system, however, does not allow the terminal means to be manually locked into any one of various adjusted positions to thereby adjust the overall length of the core element to a desired length. Also, once this prior art terminal means has been installed, it can not be easily unlocked and readjusted.

U.S. Pat. No. 3,745,853, to Deibel et al, issued Jul. 17, 1973, discloses an adjustable connecting arm assembly for use in a windshield wiper transmission linkage. The connecting arm assembly includes a main connecting arm and a connecting arm extension. The extension is a connection to a stud. The arm and extension contain teeth on one surface coacting to adjust the position of the arm relative to the extension. The extension contains an opening and the arm contains an elongated opening or slot. The opening or slot therefore receiving a headed stud. A flat spring containing an opening overlies the arm. The opening is aligned with the slot of the arm. Finally, a clamping lever overlies the flat spring and has a polygonal opening for receiving the head of the stud. The head of the stud is subsequently peened over the opening to prevent removal therefrom. The compressive force of the spring coacting upon the arm provides the necessary force to prevent relative motion between the arm and extension. This, however, requires the use of a fourth member for interconnecting the first, second, and third members. In addition, the system requires the use of a flat spring to provide the force necessary to lock the teeth of the first and second members together.

In addition, the prior art reference which was filed as a U.S. patent application, Ser. No. 856,495 to Niskanen et al, filed Apr. 28, 1986, now abandoned, discloses a terminal means attached to one end of a core element. The terminal means is for adjusting the overall effective length of the core element. The terminal means includes a first member, a second member, and a third member. The first member is molded about one end of the core element. The second member is slideably disposed within an elongated opening of the first member. The second member contains a hole for receiving a control member. The third member interconnects the first and second members and is moveable between an unlocked position, allowing relative motion between the first and second members along a portion of the core element, and a locked position for preventing such relative motion. The first and third members include locking teeth for selectively coacting. That is, when the third member is in the unlocked position, the teeth do not coact and allow relative motion between the first and second members. When the third member is in locked position, the teeth coact to prevent such relative movement. This system, however, has been found to allow slippage between the first and third members due to an undesirable moment created on the first member.

SUMMARY AND ADVANTAGES OF THE INVENTION

The present invention provides a motion transmitting remote control assembly which includes a conduit and a motion transmitting core element moveable longitudinally within the conduit to transmit motion. An adjustment means is provided for adjusting the relative lengths between the core element and the conduit. The adjustment means includes a first member having a first plurality of teeth extending in one inclined direction and a second plurality of teeth inclined in a direction extending away from the incline of the first plurality of teeth. A third member is moveable relative to the first member and includes a first plurality of teeth disposed for mating engagement with the first plurality of teeth on the first member, and a second plurality of teeth disposed for mating engagement with the second plurality of teeth on the first member.

Accordingly, the present invention includes two pluralities of teeth facing, or inclined, away from one another. The unique oppositely toothed adjustment means of the subject invention prevents any slippage between the first and third members when in the locked position, and is stronger, i.e., more resistant to slippage, than the prior art devices which included only one set of inclined teeth or multiple sets of identically inclined teeth.

BRIEF DESCRIPTION OF THE DRAWINGS

Other advantages of the present invention will be readily appreciated as the same becomes better understood by reference to the following detailed description when considered in connection with the accompanying drawings wherein:

FIG. 1 is a side elevational view of the preferred embodiment of the instant invention;

FIG. 2 is a bottom view taken substantially along line 2—2 of FIG. 1;

FIG. 3 is an end view taken substantially along line 3—3 of FIG. 1;

FIG. 4 is a cross-sectional view taken substantially along line 4—4 of FIG. 1;

FIG. 5 is a cross-sectional view taken substantially along line 5—5 of FIG. 1;

FIG. 6 is a cross-sectional view taken substantially along line 6—6 of FIG. 5; and FIG. 7 is a fragmentary enlarged view taken from the circle in FIG. 2.

DESCRIPTION OF THE PREFERRED EMBODIMENT OF FIGS. 1-7

Referring now to FIGS. 1-7, a preferred embodiment of a motion transmitting remote control assembly constructed in accordance with the instant invention is generally shown at 10. The assembly includes a conduit 12 and a motion transmitting core element 14 which is moveably supported by the conduit 12. The conduit 12 has a length and a central axis. The core element 14 also has a length and a central axis, with the axes of the conduit 12 and core element 14 being generally coincidental. Also, a fitting 16 is secured to the conduit 12 and is adapted for attachment to a support structure by a flange 18 having a hole 20 therein. Normally a fitting 16 will be disposed at each end of the conduit 12. The conduit 12 is preferably of the well known type utilized in remote control assemblies including an inner tubular member over an organic polymeric material surrounded by a plurality of filaments or long lay wires disposed on a long lead and encased in an outer jacket of organic polymeric material. The organic polymeric materials may be of the various known plastics such as polyethylene, etc. Additionally, the fitting 16 is preferably of organic polymeric material and disposed about the conduit 12.

The assembly 10 includes an adjustment means, generally indicated at 21, for adjusting the relative lengths between the core element 14 and the conduit 12. In the embodiment of FIGS. 1-7, the adjustment means 21 accomplishes this effective length adjustment by allowing the length of the core element 14, i.e., the distance between attachment points at each end of the core element 14, to be shortened or elongated depending on the need. According to the subject invention, the adjustment means 21 is of the manual type, as distinguished from the automatic, or self-adjusting type. Hence, the adjustment means 21 is maintained in an unlocked condition, moved to a correctly adjusted position, then manually locked into the adjusted position.

The adjustment means 21 includes a terminal means generally indicated at 22 for normally moving with the core element 14 in response to a force that is applied parallel to the longitudinal axis of the core element 14. The terminal means 22 is attached to the core element 14 for adjusting the position of attachment to a control member longitudinally of the axis of the core element 14 and for manually locking same in any one of the various adjusted positions therealong. More specifically, the terminal means 22 includes a first member 24, a second member 26, and a third member 28. The first member 24 is molded at the core end 72 about the terminal end of the core element 14. The first member 24 is generally rectangular in shape and includes sides with a front face 30 and a rear face 32, defining an elongated opening 34. The first member 24 includes a first 46 and second 48 plurality of teeth 50 being inclined away from each other. The first plurality 46 is inclined in one direction longitudinally of the core element 14 and the second plurality 48 is inclined in the opposite direction longitudinally of the core element 14. The teeth 50 as best seen in FIG. 7 include a vertical surface 54 and a ramping portion 52 which culminate or intersect in an apex. The first plurality 46 extends from the core end 72, first with the vertical surface 54, second with the ramping portion 52, to a center surface 68 of the first member 24. The second plurality 48 extends from a distal end 70 of the first member 24, first with the vertical surface 54, second with the ramping portion 52, to the center surface 68.

The second member 26 is slideably disposed within the elongated opening 34 of the first member 24. The second member 26 contains a cylindrical hole 36 for receiving a control member (not shown), i.e., the second member is adapted by the hole 36 for attachment to a control member. The second member 26 further contains tab portions 38 slideably engaging the raised ridge 40 on the rear face 32 of the first member 24 on opposite sides of the opening 34. The raised ridge 40 surrounds the elongated opening 34 on the rear face 30 of the first member 24. The second member 26, further contains a generally T-shaped head 42. The third member 28 interconnects the first and second members 24, 26 and is moveable between an unlocked position, allowing relative movement between the first and second members 24 and 26 along the axis of the core element 14, and a locked position for preventing such relative movement between the first and second members 24 and 26. The third member 28 has a generally C-shaped cross-section which defines a channel 44. The T-shaped head 42 of the second member 26 is slideably disposed within the channel 44 defined by the third member 28. The third member 28 further includes a first 46' and a second 48' plurality of teeth 50 adapted for mating engagement with at least some of the teeth 50 of the first member 24.

The teeth 50 selectively coact between the first and third members 24 and 28. The teeth 50 are positioned on opposite sides of the opening 34 located on the front face 30 of the first member 24. A bottom portion 56 of the third member 28 contains at least one of the pluralities of such teeth 50 for locking the third member 28 with the first member 24, and at least one smooth surface 58 for allowing the third member 28 to slide relative to the first member 24. The smooth surface 58 allows the third member 28 to slide over the row of teeth 50 on the front face 30 on the first member 24. The first and third members 24, 28 are locked into place when the teeth 50, on the bottom portion 58 of the third member 28, are slid into locking engagement with the teeth 50 on the front face 30 of the first member 24. In this position, the teeth 50 on the bottom portion 58 of the third member 20 are in meshing engagement with at least some of the teeth 50 on the front face 30 of the first member 24 when in the locked position. This engagement prevents relative motion between the first member 24 and second member 26 in the direction parallel to the longitudinal axis of the core element 14. This engagement also prevents relative motion between the first 24 and third member 26 in the direction parallel to the longitudinal axis of the core element 14 when in the locked position.

The terminal means 22 includes a latching means for preventing relative motion between the second member 26 and the third member 28 in a direction transverse to the longitudinal direction of the core element 14. The latching means includes a projection or tab 60 on the T-shaped head 42 and second member 26, with at least one hole 62 through the third member 28. Latching means provides two positions. When the latching means is in the first position (as shown in phantom in FIGS. 1 and 3), first member 24 and third member 28 are slideably engaged. When the latching means is in the second position (as shown in solid lines in FIGS. 1 and 3), first member 24 and third member 28 are in locking engagement.

The third member 28 includes a lip 64, to which a force in a direction transverse to the direction of the core element 14 can be applied for moving the third member 28 to the locked position. The third member 28 also includes a hole 66 adjacent to the lip 56 for receiving the blade of a screw driver (not shown) to which a force can be applied transversely to the longitudinal axis of the core element 14 for moving the third member 28 from the locked position to the unlocked position. The screw driver may be rotated to unlock the third member by forcing it to move transversely to the longitudinal axis of the core element 14.

In operation, the remote control assembly 10 is installed by attaching a fitting, such as that shown at 16 to a support structure and attaching the terminal means 22 to a member to be controlled (not shown) by disposing the member in the hole 36. In many of the assemblies, the opposite end of the core element 14 will have a knob attached thereto for manually longitudinally moving the flexible metal wirelike core element 14. When the assembly 10 is installed, the latching means is in the first position (shown in phantom in FIGS. 1 and 3) it provides for relative motion between the first member 24 and the second member 26 in the direction parallel to the longitudinal axis of the core element 14. The knob at the opposite end is then positioned to where the operator desires. The latching means is then moved to lock the third member 28 and the first member 24 can thereby prevent relative motion between the first member 24 and the second member 26 by manually applying a force transversely to the longitudinal axis of the core element 14 on the lip 64 of the third member 28. Once the adjustment has been made, the member to be controlled (not shown), which is disposed in hole 36, may move back and forth without relative motion between the first member 24 and the second member 26.

In addition, the first member 24 including the first 46 and second 48 plurality of teeth 50 being inclined away from one another, prevents relative motion (i.e., slipage) between the first 24 and third 26 members when a moment due to various operating conditions is placed upon the first member 24. In other words, if a downward force were placed upon the first member 24 at the distal end 70, the vertical surfaces 54 of the first pluralities 46, 46' would prevent relative motion between the first 24 and third 28 members. Likewise, if an upward force were placed upon the first member 24, at the distal end 70, the vertical surfaces 54 of the second plurality 48, 48' would prevent relative motion between the first 24 and third 28 members.

Unlocking the terminal means 22, and providing for further adjustment over the overall effective length of the core element 14 is accomplished by inserting the blade of a screw driver in the hole 58 and applying a force transversely to the longitudinal axis of the core element 14. This provides for relative movement between a third member 28 and the second member 26 to thereby adjust the second and third members 24 and 26 between the latched and unlatched positions. Once the terminal means 22 has been unlocked, an adjustment of the overall effective length of the core element 14 can be made by repeating the steps illustrated above. An alternative embodiment of the subject assembly includes a conduit 112 and a core element each having a length and extending along a substantially common axis.

The assembly includes an adjustment means for adjusting the relative lengths between the core element and the conduit. The alternative adjustment means accomplishes the effective length adjustment by allowing the length of the conduit, i.e., the distance between the fastening hole and a second support attachment, to be shortened or elongated depending on the need. As with the previous embodiment above, the assembly is of the manual adjust type.

The adjustment means includes a first member having a first plurality of teeth extending in one inclined direction relative to the conduit axis. The first member also includes a second plurality of teeth inclined in a direction extending away from the incline of the first plurality of teeth. In other words, as with the previous embodiment above, the teeth include alternating vertical and ramping surfaces, with the ramping surfaces defining an incline which is skewed relative to the conduit axis. Each of the ramping surfaces of the first plurality of teeth are disposed in respective planes which are parallel to one another. That is, each ramping surface of each tooth in the first plurality of teeth is parallel to the ramping surface of every other tooth in the first plurality of teeth.

Likewise, each ramping surface in the second plurality of teeth are disposed in planes parallel to one another, yet their planes intersect with the planes formed by the ramping surfaces of the first plurality of teeth.

The first member is supported on the exterior surface of the conduit and is fixed against axial movement. In other words, the first member including the first and second plurality of teeth are restrained from moving axially along the conduit.

The adjustment means includes a second member slideably disposed along the first member.

The adjustment means 121 also includes a third member which is disposed for movement with the second member and also relative to the first member. The third member includes a first plurality of teeth disposed for mating engagement with the first plurality of teeth on the first member. Similarly, the third member includes a second plurality of teeth disposed for mating engagement with the second plurality of teeth on the first member. In other words, the third member includes oppositely inclined teeth which are moveable into interlocking mating engagement with at least a portion of the identically oppositely inclined teeth on the first member.

The second member includes an integral conduit fastener. The conduit fastener includes a pair of resilient barbs disposed to pass through an opening in a support member upon forced insertion. Once through the opening, the barbs re-expand to prevent removal. Therefore, the conduit is supported between the support hole and the conduit fastener, and the effective length of the conduit is altered by relative movement between the third member and the first member.

The first plurality of teeth and the second plurality of teeth on the first member are disposed coextensively, or stacked, along the conduit. That is, the first and second teeth extend along the same segment of the conduit, parallel to one another, with the first plurality of teeth being disposed above the second plurality of tooth. More particularly, the first plurality of teeth on the first member include two identical sets of teeth disposed in respective planes, or faces, of the conduit which are parallel to one another and spaced on opposite sides of the conduit axis. Similarly, the second plurality of teeth on the first member include two identical sets of teeth disposed in respective planes, or on respective faces, of the conduit and are disposed parallel to one another and spaced on opposite sides of the conduit axis. Therefore, four sets of teeth are provided, with two sets being of the first plurality and the other two sets being of the second plurality.

The spacing between the two sets of the first plurality of teeth on the first member is less than the spacing between the two sets of the second plurality of teeth on the first member. Therefore, when viewed in cross section, the first plurality of teeth have a narrower disposition across the conduit, whereas the second plurality of teeth have a wider disposition across the conduit.

In order to properly and fully engage with the first member, the third member includes two sets of a first plurality of teeth and two sets of a second plurality of teeth disposed to perfectly matingly engage and interlock with the four sets of teeth of the first member. Therefore, in the unlocked position, as the third member is moved back and forth across the first member, adjustment of the effective length of the conduit is accomplished. The third member is forced downwardly, toward the first member, so that the respective teeth interlock with one another and retain the third member, and hence the conduit fastener, in the desired position relative to the conduit.

A biasing means, in the form of a compression spring, is disposed between the first and second members for urging the second member axially along the conduit. The biasing means is provided for facilitating adjustment of the assembly, in order that the second member and the third member do not freely slide back and forth along the first member. The operation of the alternative assembly is substantially related to that shown in the U.S. Pat. No. 4,177,691 to Fillmore, issued Dec. 11, 1979, assigned to the assignee of the subject invention, and hereby incorporated by reference.

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims wherein reference numerals are merely for convenience and are not to be in any way limiting, the invention may be practiced otherwise than as specifically described.

What is claimed is:

1. A motion transmitting remote control assembly (10) comprising:
   a conduit (12) having a length and a central axis;
   a motion transmitting core element (14) having a length and a central axis substantially coincidental with said conduit axis and moveable longitudinally within said conduit (12) to thereby transmit motion;
   adjustment means (20) for adjusting the relative lengths between said core element (14) and said conduit (12);
   and characterized by said adjustment means (21) including a first member (24) having a first plurality of teeth (46) extending in one inclined direction and a second plurality of teeth (48) inclined in a direction extending away from said incline of said first plurality of teeth (46), and a third member (28) moveable relative to said first member (24) and having a first plurality of teeth (46) disposed for mating engagement with said first plurality of teeth (46) on said first member (24) and a second plurality of teeth (48) disposed for mating engagement with said second plurality of teeth (48) on said first member (24).

2. An assembly (10) as set forth in claim 1 wherein said first member (24) includes a distal end (70), a center surface (68) and a core end (72) attached to said core element (14), and further including a second member (26) adapted for attachment to a control member, whereby said third member (28) interconnects said first (24) and second (26) members and is moveable between an unlocked position allowing relative movement between said first (24) and second (26) members along said axis and a locked position for preventing said relative movement between said first (24) and second (26) members.

3. An assembly as set forth in claim 2 wherein each of said first and second pluralities of teeth (50) includes a vertical surface (54) and a ramping surface (52) intersecting in an apex; said first plurality of teeth (46) extending consecutively from said core end (72) to said center surface (68); said second plurality of teeth (48) extending consecutively from said distal end (70) to said center surface (68).

4. An assembly as set forth in claim 3 wherein said third member (28) includes a first (46') and second (48') plurality of teeth (50) inclined toward one another for matingly engaging with at least some of said teeth (50) of said first member (24).

5. An assembly as set forth in claim 4 wherein said third member (28) includes a lip (64).

6. An assembly as set forth in claim 5 wherein said second member (26) includes a cylindrical hole (36) therethrough for receiving a control member.

7. An assembly as set forth in claim 6 further including a latching means for preventing relative movement between said second (26) and third (28) members in a direction transverse to the longitudinal axis of said core element (14).

8. An assembly as set forth in claim 7 wherein said latching means includes a projection upon said second member (26) and at least one hole (62) through said third member.

9. An assembly as set forth in claim 8 wherein said third member (28) has a C-shaped cross-section defining a channel (44).

10. An assembly as set forth in claim 9 wherein said second member (26) includes a generally T-shaped head (42) slideably disposed within said channel (44) of said third member (28).

11. An assembly as set forth in claim 10 wherein said first member (24) includes an elongated opening (34) therein.

12. An assembly as set forth in claim 11 wherein said first member (24) includes front (30) and rear (32) faces with said opening (34) extending therebetween.

13. An assembly as set forth in claim 12 wherein said teeth (50) of said first member (24) are disposed on opposite sides of said opening (34) on said front face (30) of said front face (30) off said first member (24).

14. An assembly as set forth in claim 13 wherein said second member (26) containing tab portions (38) slideably engaging said rear face (32) of said first member (24) on opposite sides of said opening (34) of said first member (24).

15. An assembly as set forth in claim 14 further including a raised ridge (40) surrounding said opening (34) on said rear face (32) of said first member (24), said tab portions (38) being in sliding engagement with said raised ridge (40).

16. An assembly as set forth in claim 15 wherein said third member (28) includes a bottom portion (56) having at least one row of said first and second pluralities of teeth (50) disposed therealong for locking said third member (28) to said first member (24).

17. An assembly as set forth in claim 16 wherein said bottom portions (56) includes a smooth section (58) spaced from said teeth (50) for allowing said third member (28) to slide relative to said first member (24).

18. An assembly as set forth in claim 17 wherein said third member (28) includes a hole (66) therethrough for receiving a tool applied force transversely to the longitudinal axis of said core element (14).

* * * * *